United States Patent
Zähe (10) Patent No.: US 11,598,353 B1
(45) Date of Patent: Mar. 7, 2023

(54) PRESSURE COMPENSATION VALVE WITH LOAD-SENSE FLUID SIGNAL GENERATION AND A REVERSE FREE FLOW CONFIGURATION INTEGRATED THEREWITH

(71) Applicant: Sun Hydraulics, LLC, Sarasota, FL (US)

(72) Inventor: Bernd Zähe, Sarasota, FL (US)

(73) Assignee: Sun Hydraulics, LLC, Sarasota, FL (US)

( * ) Notice: Subject to any disclaimer, the term of this patent is extended or adjusted under 35 U.S.C. 154(b) by 0 days.

(21) Appl. No.: 17/589,949

(22) Filed: Feb. 1, 2022

(51) Int. Cl.
| | | |
|---|---|---|
| F15B 13/02 | (2006.01) | |
| F16K 15/04 | (2006.01) | |
| F16K 17/04 | (2006.01) | |
| F16K 17/08 | (2006.01) | |
| F15B 13/04 | (2006.01) | |
| F15B 11/16 | (2006.01) | |
| E02F 9/22 | (2006.01) | |

(52) U.S. Cl.
CPC .......... *F15B 13/026* (2013.01); *F15B 13/027* (2013.01); *F15B 13/0417* (2013.01); *F16K 15/044* (2013.01); *F16K 17/0406* (2013.01); *F16K 17/082* (2013.01); *E02F 9/2225* (2013.01); *F15B 11/161* (2013.01); *F15B 2211/20553* (2013.01); *F15B 2211/3054* (2013.01); *F15B 2211/30545* (2013.01)

(58) Field of Classification Search
CPC .. F15B 13/026; F15B 13/027; F15B 13/0417; F15B 11/161; F15B 2211/20553; F15B 2211/3054; F15B 2211/30545; F16K 15/044; F16K 17/0406; F16K 17/082; E02F 9/2225

See application file for complete search history.

(56) References Cited

U.S. PATENT DOCUMENTS

| | | | | |
|---|---|---|---|---|
| 5,415,199 | A * | 5/1995 | Claudinon | .......... F15B 13/0417 91/512 |
| 5,930,997 | A * | 8/1999 | Hayashi | .................. E02F 9/123 60/494 |
| 10,024,342 | B2 * | 7/2018 | Terao | ..................... F15B 13/026 |
| 10,801,525 | B2 * | 10/2020 | Jadhav | .................... F16K 31/12 |
| 10,876,552 | B2 * | 12/2020 | Kutre | .................... F15B 21/006 |

* cited by examiner

*Primary Examiner* — Dustin T Nguyen (74) *Attorney, Agent, or Firm* — McDonnell Boehnen Hulbert & Berghoff LLP (57) ABSTRACT

An example valve includes: a first port, a second port, and a load-sense port; a valve piston configured to block fluid flow from the first port to the second port when the valve piston is in a neutral position; a reverse flow spring applying a first biasing force on the valve piston in a proximal direction; and a pressure compensation spring disposed in a spring chamber and applying a second biasing force on the valve piston in a distal direction, wherein when pressure level of fluid at the second port is higher than pressure level of fluid at the load-sense port, fluid flows from the second port to the spring chamber and the load-sense port, and wherein when pressure level of fluid at the load-sense port is higher than pressure level of fluid at the second port, fluid of the load-sense port is provided to the spring chamber.

20 Claims, 5 Drawing Sheets

PRESSURE COMPENSATION VALVE WITH LOAD-SENSE FLUID SIGNAL GENERATION AND A REVERSE FREE FLOW CONFIGURATION INTEGRATED THEREWITH

BACKGROUND

A hydraulic valve directs the flow of a liquid medium, usually oil, through a hydraulic system. The direction of the oil flow is determined by the position of a spool or a poppet. An example valve can have a first port where pressurized fluid is received and a second port connected to a hydraulic actuator. When pressurized fluid at the first port exceeds a particular pressure level, the valve opens and fluid flows from the first port to the second port to move the hydraulic actuator in a particular direction.

In some applications, it may desirable to allow for reverse flow from the second port to the first port to allow the hydraulic actuator to move in an opposite direction. This reverse flow feature can be accomplished by having an additional valve, which can add cost and complexity to the system. Further, some existing valves have a high cracking pressure at which reverse flow is allowed, due to seal friction among other factors, which might not be desirable.

Further, in some applications, a load-sensing hydraulic pump may be used. In such applications, it may be desirable to provide a load-sense signal indicative of the highest load in a hydraulic system to the pump. Typically, a shuttle valve or check valve network is used to resolve the highest load in the system and provide a signal to the pump. Such a network may add cost and complexity to the system. It may thus be desirable to integrate load-sense signal generation in valves providing flow metering to reduce complexity of the system.

It is with respect to these and other considerations that the disclosure made herein is presented.

SUMMARY

The present disclosure describes implementations that relate to a pressure compensation valve with load-sense fluid signal generation and a reverse free flow configuration integrated therewith.

In a first example implementation, the present disclosure describes a valve. The valve includes: a plurality of ports comprising: a first port, a second port, and a load-sense port; a valve piston configured to block fluid flow from the first port to the second port when the valve piston is in a neutral position; a reverse flow spring applying a first biasing force on the valve piston in a proximal direction; and a pressure compensation spring disposed in a spring chamber and applying a second biasing force on the valve piston in a distal direction, wherein when pressure level of fluid at the second port is higher than pressure level of fluid at the load-sense port, fluid flows from the second port to the spring chamber and the load-sense port, and wherein when pressure level of fluid at the load-sense port is higher than pressure level of fluid at the second port, fluid of the load-sense port is provided to the spring chamber, wherein fluid from the first port applies a first fluid force on the valve piston in the proximal direction, and fluid in the spring chamber applies a second fluid force on the valve piston in the distal direction. The valve operates in: (i) a first mode of operation, wherein the first fluid force of fluid from the first port overcomes the second biasing force of the pressure compensation spring and the second fluid force of fluid in the spring chamber, thereby moving the valve piston in the proximal direction and allowing fluid flow from the first port to the second port, and (ii) a second mode of operation, wherein fluid force of fluid from the second port overcomes the second biasing force of the reverse flow spring, causing the valve piston to move in the distal direction and allow fluid flow from the second port to the first port.

In a second example implementation, the present disclosure describes a hydraulic system. The hydraulic system includes: a variable displacement load-sensing pump; a fluid reservoir; a hydraulic cylinder actuator having a first chamber and a second chamber; the valve of the first example implementation, wherein the second port of the valve is fluidly-coupled to the first chamber of the hydraulic cylinder actuator, and the load-sense port is fluidly-coupled to the variable displacement load-sensing pump; and a directional control valve interposed between the variable displacement load-sensing pump and the valve, wherein the variable displacement load-sensing pump is configured to provide fluid having a pressure level equal to pressure level of fluid of the load-sense port plus a margin pressure to the directional control valve.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

In some example applications, a hydraulic actuator can have two chambers, each chamber having fluid at a respective pressure level. The higher pressure level of the respective pressure levels in the chambers can be indicative of the load to which the hydraulic actuator is subjected.

An example hydraulic system can include a load-sensing variable displacement pump as a source of fluid. The load-sensing variable displacement pump can be configured to receive a load-sense pressure fluid signal indicative of the higher pressure level of the respective pressure levels in the chambers and provide a flow output that has a pressure level equal to the pressure level of the load-sense fluid signal plus a margin pressure setting so as to drive the hydraulic actuator. In other words, output pressure level of the pump minus pressure level of the load-sense fluid signal is equal to the margin pressure setting.

Particularly, the load-sensing variable displacement pump can be configured to add or subtract output flow to create the margin pressure setting in response to the pressure level of the load-sense fluid signal. It may be desirable to have a valve configured to generate the load-sense fluid signal so as to operate the pump, rather than having external hydraulic connections coupled to the chambers of the actuator and shuttle valves to provide the load-sense fluid signal to the pump.

In an example, the valve can be configured as a pressure compensating valve and can operate in a manner that maintains a constant pressure drop across a throttling/metering flow opening of a directional control valve. It may be desirable to generate a load-sense fluid signal indicative of the highest load in a hydraulic system having multiple actuators subjected to varying loads. It may also be desirable to have each pressure compensator valve receiving such load-sense fluid signal, such that inlet fluid pressure to the pressure compensator valve varies so as to maintain a constant pressure drop across all directional control valves in the system.

It may also be desirable to allow forward fluid flow from a first port of the valve to a second port of the valve when the valve is operating as a pressure compensator, while also allowing for reverse flow from the second port to the first port of the valve under some operating conditions. Rather than having separate valves performing such operations (e.g., generating load-sense fluid signal, providing pressure compensation, and allowing for reverse flow), it may be desirable to have a single valve integrating such operations to reduce cost and complexity of the system.

Disclosed herein is a valve configured to operate as a pressure compensator valve as it allows fluid flow from a first port to a second port to facilitate maintaining a substantially constant pressure drop or differential across a throttling or directional control valve. The term "substantially" is used herein to indicate that the pressure drop is maintained within a threshold (e.g., 0-5%) of a particular target pressure drop.

The valve is further configured to continually provide an LS signal in various operating conditions. Further, the valve allows reverse free flow from the second port to the first port. The reverse free flow is allowed at a lower crack pressure compared to conventional valves due to the lack of a seal and also due to configuring the valve such that a pressure differential acts on a full surface area of a valve piston, thereby increasing the fluid force acting against a spring that keeps the valve closed for flow from the second port to the first port. As such, lower pressure levels are capable of overcoming the spring and allowing reverse flow.

Figure 1:
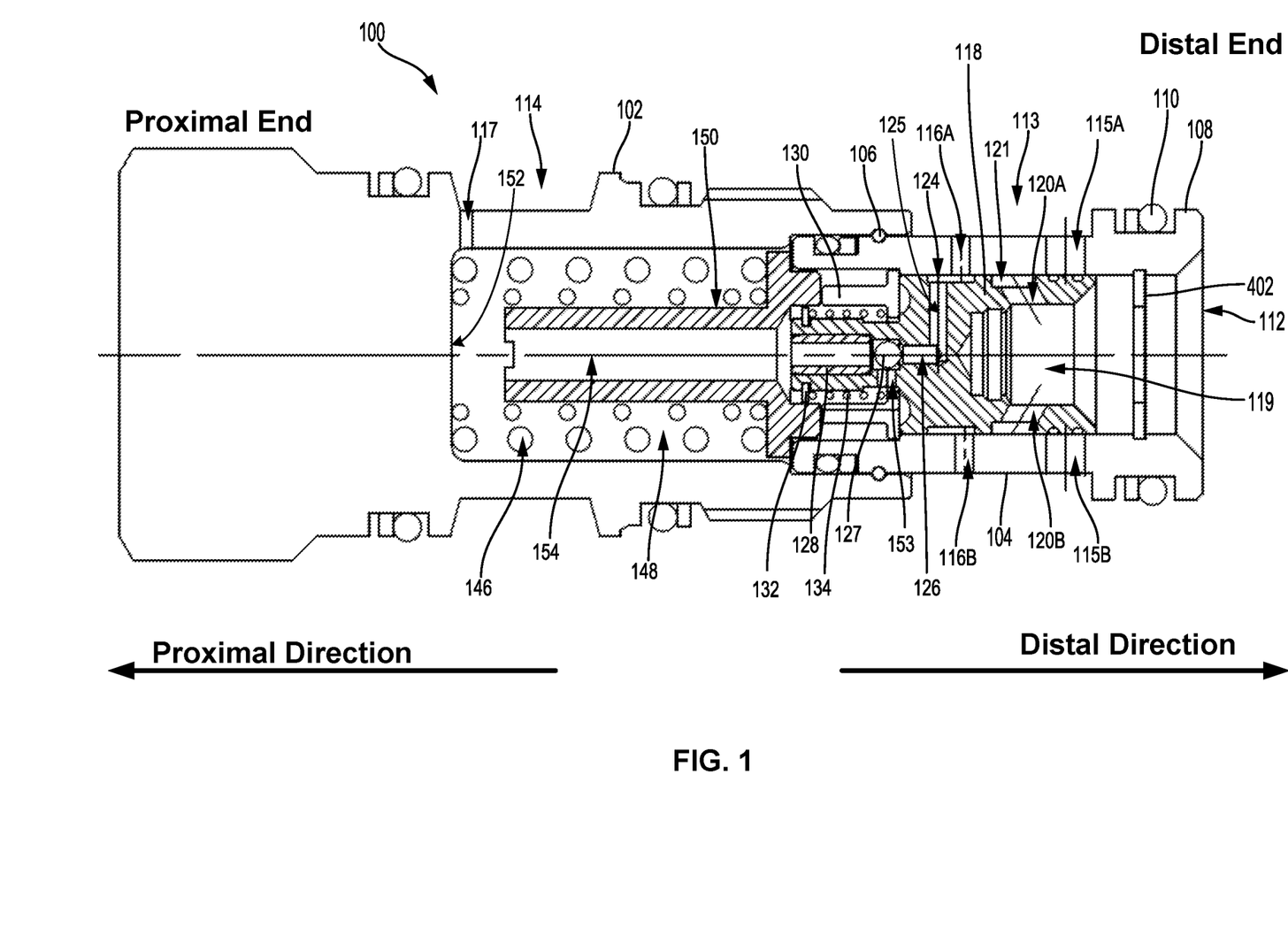
FIG. 1 illustrates a cross-sectional side view of a valve in a neutral position, in accordance with an example implementation.

FIG. 1 illustrates a cross-sectional side view of a valve 100 in a neutral position, in accordance with an example implementation. The valve 100 may be inserted or screwed into a manifold having ports corresponding to ports of the valve 100 described below, and can thus fluidly couple the valve 100 to other components of a hydraulic system.

The valve 100 includes a housing 102 that includes a longitudinal cylindrical cavity therein. The valve 100 also includes a sleeve 104 received at a distal end of the housing 102. The sleeve 104 can be retained to the housing 102 via a retention ring 106 (e.g., an O-ring or a wire ring) disposed in an annular space formed by an exterior annular groove formed in the sleeve 104 and a corresponding interior annular groove formed in the housing 102.

A distal end of the sleeve 104 can have an enlarged diameter section 108 configured to have a seal 110 (e.g., an O-ring). When the valve 100 is inserted into a manifold, the seal 110 precludes leakage around the valve 100.

The valve 100 includes a first port 112, a second port 113, and a third port that can be referred to as a load-sense port 114. The first port 112 is defined at a nose or distal end of the sleeve 104, whereas the second port 113 and the load-sense port 114 are disposed laterally with respect to (i.e., on the side of) the sleeve 104 and the housing 102.

The second port 113 can be fluidly-coupled to a chamber of a hydraulic actuator to provide fluid flow thereto and receive fluid flow therefrom. The second port 113 can include a first set of cross-holes that can be referred to as main flow cross-holes, such as main flow cross-hole 115A and main flow cross-hole 115B, disposed in a circumferential array about an exterior surface of the sleeve 104. The main flow cross-holes 115A, 115B provide main flow to and receive fluid flow discharged from the hydraulic actuator.

The second port 113 can also include a second set of cross-holes that can be referred to as input load signal cross-holes, such as input load signal cross-hole 116A and input load signal cross-hole 116B, disposed in a circumferential array about the exterior surface of the sleeve 104. Similar to the main flow cross-holes 115A, 115B, the input load signal cross-holes 116A, 116B receive fluid from the hydraulic actuator. The pressure level of such fluid is indicative of the load to which the hydraulic actuator is subjected. In other words, the fluid flowing through the input load signal cross-holes 116A, 116B can be considered an input load-sense fluid signal.

As depicted in FIG. 1, the input load signal cross-holes 116A, 116B are axially-spaced from the main flow cross-holes 115A, 115B along a length of the sleeve 104. The term "hole" is used generally herein to indicate a hollow place (e.g., cavity) in a solid body or surface, for example. The term "cross-hole" is used herein to encompass any type of opening (e.g., slot, window, hole, etc.) that crosses a path of, or is formed transverse relative to, another hole, cavity, or channel.

The load-sense port 114 includes one or more cross-holes that can be referred to as output load-sense cross-holes, such as output load-sense cross-hole 117. The output load-sense cross-hole 117 is formed in the housing 102. As described below, the input load-sense signal received at the second port 113 can be provided externally through the output load-sense cross-hole 117 of the load-sense port 114.

The sleeve 104 includes a respective longitudinal cylindrical cavity therein, and the valve 100 includes a valve piston 118 that is axially-movable within the longitudinal cylindrical cavity of the sleeve 104. The term "piston" is used herein to encompass any type of movable element, such as a spool-type movable element or a poppet-type movable element.

The valve piston 118 is disposed, and slidably-accommodated, in the longitudinal cylindrical cavity of the sleeve 104. The term "slidably accommodated" is used herein to indicate that a first component (e.g., the valve piston 118) is positioned relative to a second component (e.g., the sleeve 104) with sufficient clearance therebetween, enabling movement of the first component relative to the second component in the proximal and distal directions. As such, the first component (e.g., valve piston 118) is not stationary, locked, or fixedly disposed in the valve 100, but rather, is allowed to move relative to the second component (e.g., the sleeve 104).

The valve piston 118 has a main chamber 119 formed therein and has and piston cross-holes 120A, 120B disposed in a circumferential array about an exterior surface of the valve piston 118. Further, the valve piston 118 has an annular chamber or annular groove 121 formed between the exterior surface of the valve piston 118 and the interior surface of the sleeve 104. The annular groove 121 is fluidly-coupled to the piston cross-holes 120A, 120B, which in turn are fluidly-coupled to the main chamber 119.

As shown in FIG. 1, in the neutral position, where the valve 100 blocks fluid flow between the first port 112 and the second port 113, the annular groove 121 is blocked by the sleeve 104. Further, the valve piston 118 blocks the main flow cross-holes 115A, 115B. The term "block" is used throughout herein to indicate substantially preventing fluid flow except for minimal or leakage flow of drops per minute, for example.

The valve piston 118 further includes an annular groove 124 that is fluidly-coupled to, or in fluid communication with, the input load signal cross-hole 116A. The valve piston 118 also includes a radial channel or cross-hole 125 and a longitudinal channel 126. The cross-hole 125 fluidly couples the annular groove 124 to the longitudinal channel 126. The longitudinal channel 126 varies in diameter along its length to accommodate a check element 127 and a roll pin 128. The check element 127 is depicted as a ball; however, other check elements such as a poppet could be used. As described below, the check element 127 allows fluid flow from the second port 113 to the load-sense port 114 when pressure level at the second port 113 is higher than the pressure level at the load-sense port 114, but precludes fluid flow from the load-sense port 114 to the second port 113.

The valve 100 further includes a bushing 130 disposed within the sleeve 104 and abutting the valve piston 118. As described below, the bushing 130 is axially-movable with the valve piston 118 in the proximal direction when the valve 100 operates in a first mode of operation.

Figure 2A:
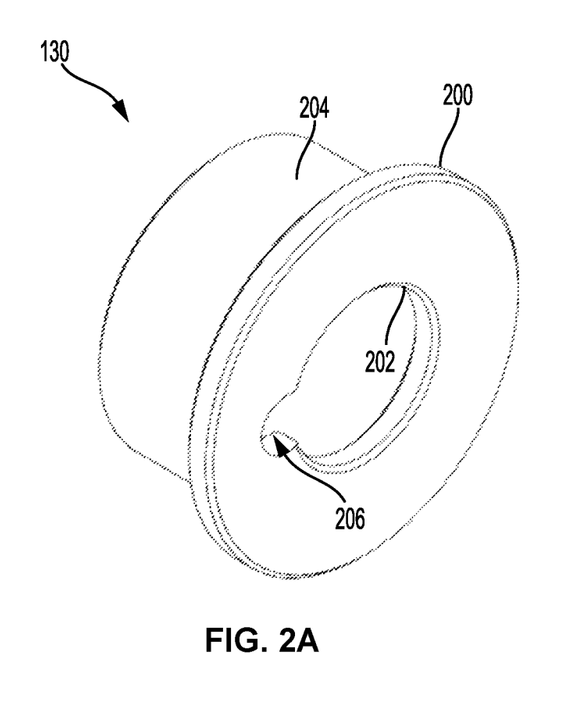
FIG. 2A illustrates a perspective view of a bushing of the valve of FIG. 1, in accordance with an example implementation.
Figure 2B:
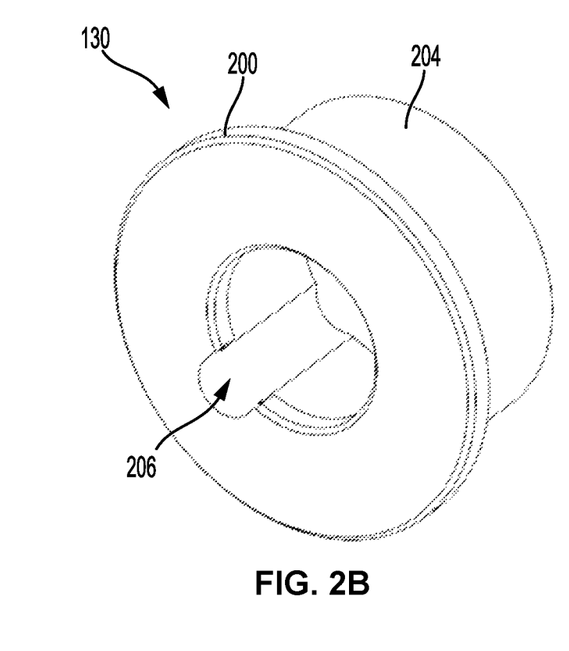
FIG. 2B illustrates a different perspective view of the bushing of FIG. 2A, in accordance with an example implementation.

FIG. 2A illustrates a perspective view of the bushing 130, and FIG. 2B illustrates a different perspective view of the bushing 130, in accordance with an example implementation. As shown in FIG. 2A-2B, the bushing 130 has a first flange 200 and a second flange 202. The term "flange" is used herein to indicate a rim or edge projecting from a cylindrical portion 204 of the bushing 130. In the example implementation of the bushing 130 shown in the figures, the first flange 200 is an external flange (i.e., the rim protrudes radially-outward), whereas the second flange 202 is an internal flange (i.e., the rim protrudes radially-inward). Further, the bushing 130 includes a slot 206 that allows for fluid flow through the bushing 130.

Referring back to FIG. 1, the valve 100 has a spring retaining ring 132 disposed in a groove defined in the exterior surface of the valve piston 118. The valve 100 includes reverse flow spring 134 disposed around an exterior peripheral surface of the valve piston 118 between the second flange 202 of the bushing 130 and the spring retaining ring 132. The reverse flow spring 134 applies a biasing force on the valve piston 118, via the spring retaining ring 132, in the proximal direction.

The valve 100 further includes one or more pressure compensation springs referred to collectively as pressure compensation spring 146 disposed within a spring chamber 148. Although the pressure compensation spring 146 is shown in FIG. 1 as having a nested spring configuration, in other implementations a single spring can be used as desired in a particular application.

The pressure compensation spring 146 is disposed or retained between a compensation spring cap 150 and an interior proximal surface 152 of the housing 102. With this configuration, the pressure compensation spring 146 applies a biasing force on the compensation spring cap 150 in the distal direction. The compensation spring cap 150 has a channel 154 that allows fluid communication from the second port 113 to the load-sense port 114 as described below.

As shown in FIG. 1, when the valve 100 is in the neutral position, the compensation spring cap 150 abuts a proximal end of the sleeve 104. The compensation spring cap 150 may also interface with the bushing 130, which in turn abuts the valve piston 118. Thus, motion of the valve piston 118 in the proximal direction is opposed by the biasing force of the pressure compensation spring 146, applied to the valve piston 118 via the compensation spring cap 150 and the bushing 130.

Further, the spring chamber 148 is filled with fluid having the same pressure level as the load-sense port 114. Such fluid applies a fluid force on the compensation spring cap 150, along with the pressure compensation spring 146, in the distal direction.

The biasing force of the pressure compensation spring 146 determines the pressure setting of the valve 100. The pressure setting of the valve 100 is the pressure differential between the first port 112 and the load-sense port 114 (i.e., the difference between pressure level of fluid at the first port 112 and a respective pressure level of fluid at the load-sense port 114) at which the valve 100 can open to allow fluid flow from the first port 112 to the second port 113.

Specifically, based on a spring rate of the pressure compensation spring 146 and the length of the pressure compensation spring 146, the pressure compensation spring 146 exerts a particular biasing force on the compensation spring cap 150, and thus on the valve piston 118, in the distal direction, and the pressure setting is based on the particular biasing force of the pressure compensation spring 146. As an example for illustration, the pressure setting of the valve 100 can be about 50 pounds per square inch (psi).

Unless the pressure level at the load-sense port 114 is higher than the pressure level at the second port 113, fluid at the second port 113 can flow through the input load signal cross-hole 116A, then through the annular groove 124, the cross-hole 125, and the longitudinal channel 126. Fluid then pushes the check element 127 in the proximal direction, and flows around the check element 127 and through the roll pin 128 (or through cross-hole 153 in the valve piston 118 and through the slot 206 of the bushing 130) and the channel 154 to fill the spring chamber 148, and flows out of the valve 100 through the output load-sense cross-hole 117 of the load-sense port 114. The roll pin 128 operates as a stop for the check element 127.

As mentioned above, in examples, the second port 113 can be fluidly coupled to a chamber of a hydraulic actuator (e.g., a hydraulic cylinder actuator). As such, the fluid signal provided from the second port 113 to the load-sense port 114 can be indicative of the load to which the hydraulic actuator is subjected. In examples, as described below with respect to FIG. 5, the load-sense port 114 can be fluidly-coupled to chambers of other hydraulic actuators of the system, and may thus have higher pressure level than the second port 113. In this case, the spring chamber 148 is filled with fluid from the load-sense port 114 having pressure level higher than the pressure level at the second port 113, and the check element 127 blocks fluid flow from the load-sense port 114 to the second port 113.

The valve 100 is configured to operate in at least two modes of operation. In a first mode of operation, the valve 100 operates as a pressure compensation valve configured to open a fluid path from the first port 112 to the second port 113 when the pressure differential between the first port 112 and the load-sense port 114 reaches or exceeds the pressure setting determined by the pressure compensation spring 146. In other words, the fluid force of fluid from the first port 112 acting on the valve piston 118 overcomes both the biasing force of the pressure compensation spring 146 and a respective fluid force of fluid from the load-sense port 114 acting on the valve piston 118 (via the compensation spring cap 150 and the bushing 130) in the distal direction.

Figure 3:
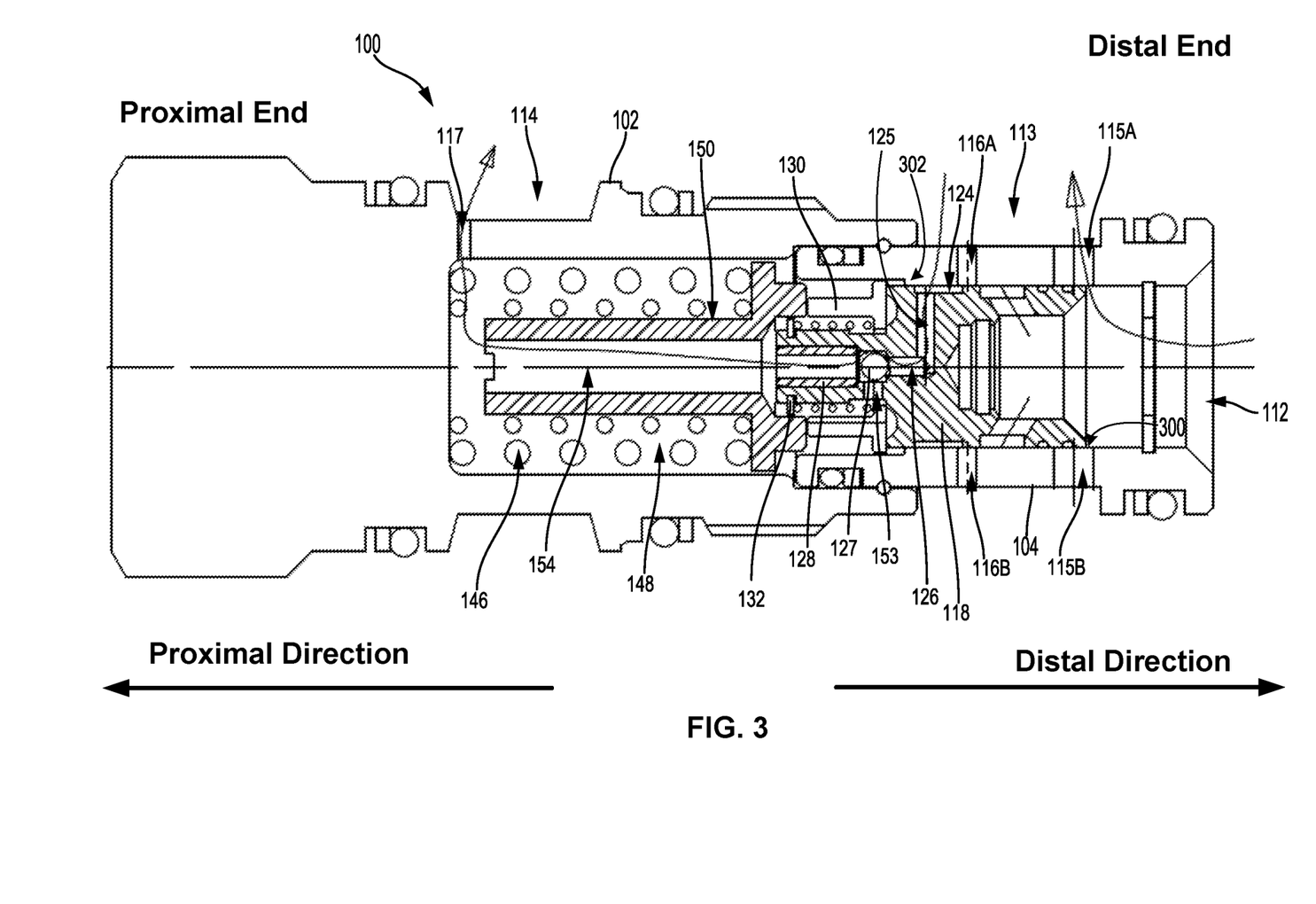
FIG. 3 illustrates a cross-sectional side view of the valve of FIG. 1 operating in a first mode of operation as a pressure compensation valve allowing fluid flow from a first port to a second port, in accordance with an example implementation.

FIG. 3 illustrates a cross-sectional side view of the valve 100 operating in a first mode of operation as a pressure compensation valve allowing fluid from the first port 112 to the second port 113, in accordance with an example implementation. In particular, in this first mode of operation, the valve 100 allows fluid flow from the first port 112 to the second port 113, when the fluid force of fluid at the first port 112 overcomes the fluid force of fluid in the spring chamber 148 and the biasing force of the pressure compensation spring 146. Fluid in the spring chamber 148 can be fluid from the second port 113 or the load-sense port 114 based on which port has fluid at a higher pressure.

Pressurized fluid at the first port 112 applies a first fluid force $F_1$ on the valve piston 118 in the proximal direction. If pressure level of fluid at the second port 113 is higher than pressure level of fluid at the load-sense port 114, fluid flows from the second port 113 through the input load signal cross-hole 116A, then through the annular groove 124, the cross-hole 125, and the longitudinal channel 126. Fluid then pushes the check element 127 in the proximal direction, and flows around the check element 127 and through the roll pin 128 (or through cross-hole 153 in the valve piston 118 and through the slot 206 of the bushing 130) and the channel 154 to fill the spring chamber 148, and flows out of the valve 100 through the output load-sense cross-hole 117 of the load-sense port 114 as depicted in FIG. 3 by a flow arrow.

On the other hand, if the load-sense port 114 receives a load-sense fluid signal from an external source (e.g., from a respective load-sense port of another valve similar to the valve 100) that has a higher pressure level than fluid at the second port 113, the spring chamber 148 receives fluid from the load-sense port 114 and the check element 127 blocks the longitudinal channel 126 to preclude flow from the load-sense port 114 to the second port 113. Regardless of where fluid in the spring chamber 148 is received from, such fluid applies a second fluid force $F_2$ on the valve piston 118 in the distal direction. Additionally, the pressure compensation spring 146 applies a biasing force $F_{Spr}$ on the valve piston 118 (via the compensation spring cap 150 and the bushing 130) in the distal direction.

Thus, a net force $F_{Net}$ equal to the difference between the first fluid force acting in the proximal direction and a combination of the second fluid force and the biasing force of the pressure compensation spring 146 is applied to the valve piston 118, i.e., $F_{Net}=F_1-(F_2+F_{Spr})$ is applied to the valve piston 118. As long as the first fluid force $F_1$ is not sufficient to overcome the biasing force $F_{Spr}$ of the pressure compensation spring 146 and the second fluid force $F_2$, the valve piston 118 does not move in the proximal direction.

If the pressure level $P_1$ of fluid at the first port 112 increases such that the first fluid force overcomes the biasing force $F_{Spr}$ of the pressure compensation spring 146 and the second fluid force $F_2$, i.e., $F_{Net}$ has a positive value, the valve piston 118 moves in the proximal direction. As the valve piston 118 moves, the bushing 130 and the compensation spring cap 150 move therewith, thereby compressing the pressure compensation spring 146 until a new equilibrium position (as shown in FIG. 3) is achieved (i.e., until $F_{Net}=0$).

As the valve piston 118 moves in the proximal direction, the distal end of the valve piston 118 can move past distal edges of the main flow cross-holes 115A, 115B. As a result, a flow area 300 is formed between the valve piston 118 and the sleeve 104, allowing fluid flow from the first port 112 through the main flow cross-holes 115A, 115B to the second port 113, which can be fluidly-coupled to a hydraulic actuator (e.g., hydraulic cylinder or motor).

Once the pressure level $P_1$ decreases to a level at which $F_{Net}<0$, the pressure compensation spring 146 pushes the compensations spring cap 150, the bushing 130, and the valve piston 118 back in the distal direction. The bushing 130 can move in the distal direction until it reaches a shoulder 302 formed in the sleeve 104, which precludes the bushing 130 from moving further in the distal direction. The valve piston 118 re-blocks the main flow cross-holes 115A, 115B, thereby blocking fluid flow from the first port 112 to the second port 113.

The valve 100 is further configured to operate in a second mode of operation that can be referred to as reverse free flow mode. The term "reverse flow" is used herein to indicate fluid flow from the second port 113 to the first port 112 (reverse flow direction) as opposed to fluid flow from the first port 112 to the second port (forward flow direction) in the first mode of operation. The term "free" indicates that fluid flow can occur at a substantially low pressure (e.g., 15 psi) at the second port 113.

Figure 4:
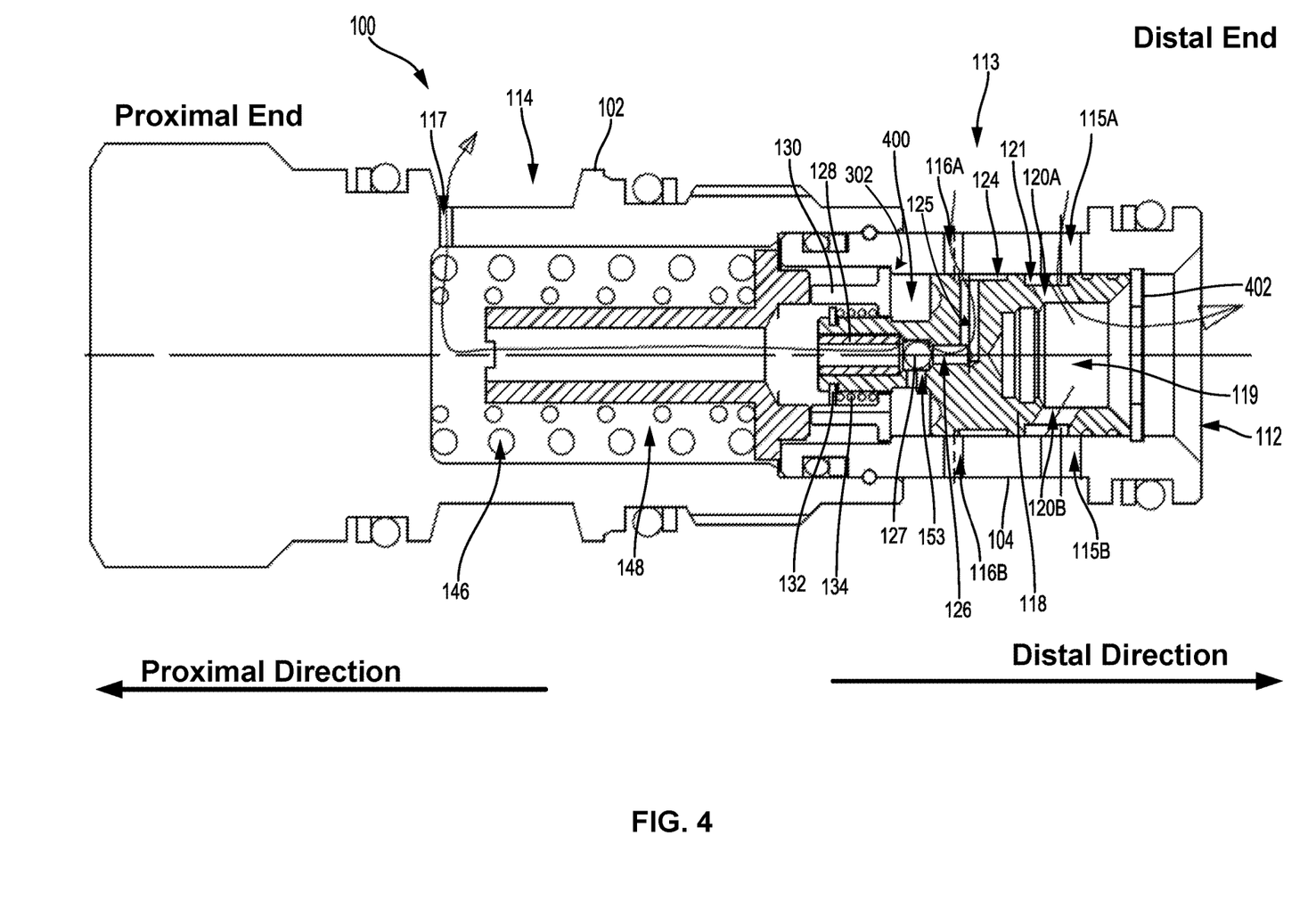
FIG. 4 illustrates a cross-sectional side view of the valve of FIG. 1 operating in a second mode of operation allowing reverse free flow from the second port to the first port, in accordance with an example implementation.

FIG. 4 illustrates a cross-sectional side view of the valve 100 operating in a second mode of operation allowing reverse free flow from the second port 113 to the first port 112, in accordance with an example implementation. As mentioned above, the second port 113 can be fluidly-coupled to a hydraulic actuator. For instance, the hydraulic actuator can be a hydraulic cylinder having a movable actuator piston. When the valve 100 operates in the first mode of operation, the actuator piston can extend as fluid flows from the first port 112 to the second port 113 then to the hydraulic cylinder. To retract the actuator piston, fluid flows in a reverse direction, from the hydraulic cylinder to second port 113. The valve 100 is configured such that a low pressure level (e.g., 15 psi) can cause the valve 100 to allow fluid flow from the second port 113 to the first port 112 to allow the actuator piston to retract.

In this second mode of operation, similar to the first mode of operation, fluid at the second port 113 can flow through the input load signal cross-hole 116A, then through the annular groove 124, the cross-hole 125, and the longitudinal channel 126. Fluid then pushes the check element 127 in the proximal direction, flows through the cross-hole 153 to fill chamber 400, which is considered as part of the spring chamber 148. Fluid in the chamber 400 applies a fluid force on the valve piston 118 in the distal direction.

Fluid at the first port 112 applies a second fluid force on the valve piston 118 in the proximal direction. Thus, a net fluid force equal to the difference between the first fluid force and the second fluid force acts on the valve piston 118 in the distal direction. In this case, however, the first port 112 may be fluidly-coupled to a fluid reservoir (e.g., via a directional control valve) having fluid at a low pressure level, and thus the second fluid force may be small.

Once such net fluid force overcome the reverse flow spring 134, the valve piston 118 moves in the distal direction, separating from the bushing 130, which is precluded from moving with the valve piston 118 because of the shoulder 302. As the valve piston 118 moves in the distal direction, the reverse flow spring 134 is compressed via the spring retaining ring 132. The valve piston 118 moves until an equilibrium is achieved between the spring force of the reverse flow spring 134 acting in the proximal direction and the net fluid force acting in the distal direction. The reverse flow spring 134 may be configured as a weak spring (e.g., applying a 0.1 pound force) such that a low pressure level at the second port 113 (15 psi) is sufficient to overcome the reverse flow spring 134 and move the valve piston 118.

In an example, the valve 100 has an internal retainer 402 mounted within the sleeve 104. The internal retainer 402 operates as a stop for the valve piston 118 when the valve 100 operates in this reverse free flow mode. In other words, the valve piston 118 can move in the distal direction until it reaches the internal retainer 402 as depicted in FIG. 4.

Further, as shown in FIG. 4, as the valve piston 118 moves in the distal direction, the annular groove 121 overlaps with the main flow cross-holes 115A, 115B. As such, fluid is allowed to flow from the second port 113, through the main flow cross-holes 115A, 115B and the annular groove 121, then through the piston cross-holes 120A, 120B to the main chamber 119, then to the first port 112.

The valve 100 may offer several advantages compared to conventional valves. The valve integrates a pressure compensation valve (as described below with respect to FIG. 5) with a reverse flow valve in a single cartridge valve, reducing cost and complexity. Further, in the reverse flow mode illustrated in FIG. 4, the valve piston 118 does not have any seals, and thus no seal friction hinders its movement. Further, the fluid at the second port 113 and the first port 112 act on a surface area with the largest outer diameter (D) of the valve piston 118. This increases the fluid force for a given pressure level. As such, a low pressure level (e.g., atmospheric pressure) at the second port 113 is capable of "cracking" the valve 100 open. This contrasts with conventional valves that has seals mounted to movable member and are configured such that fluids act on a smaller cross sectional area of the movable member.

Notably, similar to the first mode of operation, in the second mode of operation, a load-sense fluid signal is provided from the second port 113 to the load-sense port 114. As shown by the flow arrow in FIG. 4, fluid from the second port 113 also flows through the roll pin 128 or through the slot 206 of the bushing 130, to the spring chamber 148. Fluid can then flow through the output load-sense cross-hole 117 of the load-sense port 114 to be communicated externally (to a load-sensing pump for example).

The valve 100 can be used as a post pressure compensation valve in a system. In such systems, the valve 100 can replace three valves. Particularly, the valve 100 can operate as a pressure compensator, while also providing a load-sense signal without additional load-sense shuttle or check valves, and further allowing reverse flow without having an additional valve.

Post pressure compensation is a method of flow sharing that allows all actuators in a hydraulic circuit to operate regardless of demand from actuators, even if pump flow is not enough to satiate the demands of each actuator. The system compensates for changes in flow demand by reducing flow proportionally to all actuators. The term "post-compensation" is used to indicate the pressure compensation valve is disposed after the metering control valve (e.g., a directional control metering valve) and operates to maintain a constant pressure drop across the metering control valve.

Figure 5:
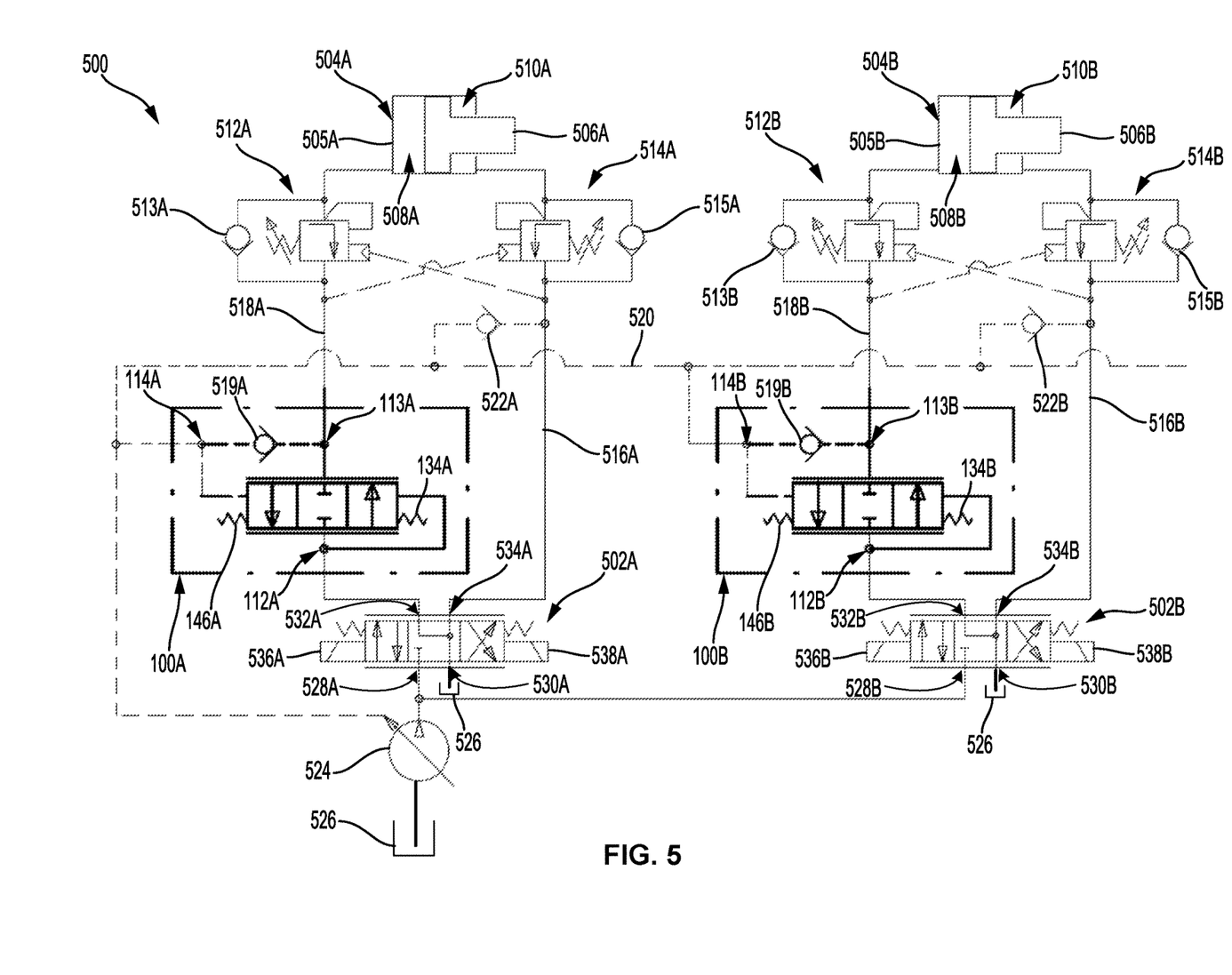
FIG. 5 illustrates a hydraulic system, in accordance with an example implementation.

FIG. 5 illustrates a hydraulic system 500, in accordance with an example implementation. The hydraulic system 500 can include a directional control valve 502A configured to control fluid flow to and from hydraulic actuators such as hydraulic cylinder actuator 504A, and a directional control valve 502B configured to control fluid flow to and from hydraulic cylinder actuator 504B. Hydraulic cylinder actuators are used herein as an example hydraulic actuator to illustrate operation of the hydraulic system 500. It should be understood that different types of hydraulic actuators (e.g., hydraulic motors) can be used.

The hydraulic cylinder actuator 504A includes a cylinder 505A and an actuator piston 506A that is slidably-accommodated in the cylinder 505A. The actuator piston 506A includes a piston head and a rod extending from the piston head along a central longitudinal axis direction of the cylinder 505A. The piston head divides the inner space of the cylinder 505A into a first chamber 508A and a second chamber 510A.

Similarly, the hydraulic cylinder actuator 504B includes a cylinder 505B and an actuator piston 506B that is slidably-accommodated in the cylinder 505B. The actuator piston 506B includes a piston head and a rod extending from the piston head along a central longitudinal axis direction of the cylinder 505B. The piston head divides the inner space of the cylinder 505B into a third chamber 508B and a fourth chamber 510B.

The hydraulic system 500 can include a counterbalance valve 512A that controls flow of fluid discharged from the first chamber 508A, and a counterbalance valve 514A that controls flow of fluid discharged from the second chamber 510A. A counterbalance valve is used in the hydraulic system to control an overriding (run-away) or suspended load. For example, if the actuator piston 506A retracts with gravity under load, the counterbalance valve 512A creates backpressure at the fluid line that fluidly couples the counterbalance valve 512A to the first chamber 508A to prevent losing control over the load.

In particular, if the directional control valve 502A is shifted into position that allows the actuator piston 506A to retract (move to the left in FIG. 5), then the fluid from the first chamber 508A can open the counterbalance valve 512A only if pilot pressure at a pilot port (which is connected to fluid line 516A) of the counterbalance valve 512A and the load pressure at the first chamber 508A create enough force to overcome a spring force of the counterbalance valve 512A and open it to allow fluid flow therethrough. The counterbalance valve 512A has a check valve 513A that allows free fluid flow into the first chamber 508A when the actuator piston 506A extends (moves to the right in FIG. 5).

Similarly, if the actuator piston 506A extends with gravity under load, the counterbalance valve 514A creates backpressure at the fluid line that fluidly couples the counterbalance valve 514A to the second chamber 510A to prevent losing control over the load. In particular, if the directional control valve 502A is shifted into position that allows the actuator piston 506A to extend (move to the right in FIG. 5), then the fluid from the second chamber 510A can open the counterbalance valve 514A only if pilot pressure at a pilot port (which is connected to fluid line 518A) of the counterbalance valve 514A and the load pressure at the second chamber 510A create enough force to overcome a spring force of the counterbalance valve 514A and open it to allow fluid flow therethrough. The counterbalance valve 514A has a check valve 515A that allows free fluid flow into the second chamber 510A when the actuator piston 506A retracts (moves to the left in FIG. 5).

The hydraulic system 500 can further include counterbalance valve 512B and counterbalance valve 514B that operate similar to the counterbalance valves 512A, 514A, respectively, with respect to the hydraulic cylinder actuator 504B. The counterbalance valve 512B controls flow of fluid discharged from the third chamber 508B into fluid line 518B. The counterbalance valve 512B has a check valve 513B (similar to the check valve 513A) that allows free flow into the third chamber 508B. Similarly, the counterbalance valve 514B controls flow of fluid discharged from the fourth chamber 510B into fluid line 516B. The counterbalance valve 514B has a check valve 515B (similar to the check valve 515A) that allows free flow into the fourth chamber 510B.

The hydraulic system 500 further includes two pressure compensation valves capable of generating load-sense fluid signals and having reverse free flow features integrated therewith such as valves 100A, 100B symbolically represented in FIG. 5. The valves 100A, 100B both represent the valve 100 described above with respect to FIGS. 1-4 and have the same components of the valve 100. Therefore, the components or elements of valves 100A, 100B are designated with the same reference numbers used for the valve 100 in FIGS. 1-4 with an "A" or "B" suffix The configuration of the check element 127 of the valve 100A is represented symbolically as a check valve 519A that allows flow from the second port 113A to the load-sense port 114A (when pressure level at the second port 113A is higher than pressure level at the load-sense port 114A), while blocking flow from the load-sense port 114A to the second port 113A. Similarly, the configuration of the check element 127 of the valve 100B is represented symbolically as a check valve 519B that allows flow from the second port 113B to the load-sense port 114B, while blocking flow from the load-sense port 114B to the second port 113B.

Notably, the hydraulic system 500 includes a load-sense fluid line 520 that is fluidly-coupled to both the load-sense port 114A of the valve 100A and the load-sense port 114B of the valve 100B. The hydraulic system 500 further includes a load-sense check valve 522A that fluidly couples the fluid line 516A to the load-sense fluid line 520, and includes a load-sense check valve 522B that fluidly couples the fluid line 516B to the load-sense fluid line 520.

With this configuration, the one chamber having the highest pressure level among the four chambers 508A, 510A, 508B, 508B communicates a load-sense fluid signal to the load-sense fluid line 520. For example, if the second port 113A (which is fluidly-coupled to the first chamber 508A via the fluid line 518A and counterbalance valve 512A) has the highest pressure level, it communicates a load-sense fluid signal to the load-sense port 114A, which then communicates it to the load-sense fluid line 520, and such high pressure signal keeps the check valves 519B, 522A, 522B closed. On the other hand, if the second port 113B (which is fluidly-coupled to the third chamber 508B via the fluid line 518B and counterbalance valve 512B) has the highest pressure level, it communicates a load-sense fluid signal to the load-sense port 114B, which then communicates it to the load-sense fluid line 520, and such high pressure signal keeps the check valves 519A, 522A, 522B closed.

If the fluid line 516A (which is fluidly-coupled to the second chamber 510A via the counterbalance valve 514A) has the highest pressure level, it communicates a load-sense fluid signal to the load-sense fluid line 520 via the load-sense check valve 522A, and such high pressure signal keeps the check valves 519A, 519B, 522B closed. On the other hand, if the fluid line 516B (which is fluidly-coupled to the fourth chamber 510B via the counterbalance valve 514B) has the highest pressure level, it communicates a load-sense fluid signal to the load-sense fluid line 520 via the load-sense check valve 522B, and such high pressure signal keeps the check valves 519A, 519B, 522A closed.

With this configuration, the load-sense fluid line 520 receives a load-sense fluid signal representing the highest load among the hydraulic actuators of the hydraulic system 500, and such load-sense fluid signal is communicated to all load-sense ports (e.g., the load-sense port 114A and the load-sense port 114B of the valves 100A, 100B). This way, the load-sense port 114A, 114B have the same pressure level. Two actuators and two valves 100A, 100B are used herein to describe multiple actuator systems. It should be understood that the hydraulic system 500 can include several additional actuators.

The hydraulic system 500 can include a variable displacement load-sensing pump 524 and a fluid reservoir 526. In an example, the variable displacement load-sensing pump 524 can draw fluid from the fluid reservoir 526 and displace the fluid to the directional control valves 502A, 502B, which are interposed between the variable displacement load-sensing pump 524 and the valves 100A, 100B, respectively. The fluid reservoir 526 can store fluid at a low pressure level such as atmospheric pressure level. The fluid reservoir 526 is depicted at several places in FIG. 5 to reduce visual clutter in the drawing. It should be understood that the hydraulic system 500 can have a single fluid reservoir.

As depicted schematically in FIG. 5, the variable displacement load-sensing pump 524 receives the load-sense fluid signal from the load-sense fluid line 520. In particular, the variable displacement load-sensing pump 524 can have a pump load-sense port that receives the load-sense fluid signal. The variable displacement load-sensing pump 524 has a mechanism (not shown) that changes the amount of fluid flow discharged by the variable displacement load-sensing pump 524 (e.g., by varying a swash plate angle of a variable displacement piston pump) such that the variable displacement load-sensing pump 524 discharges fluid having the pressure level of the load-sense fluid signal plus a margin pressure (e.g., 300 psi margin). As an example for illustration, if the load-sense fluid signal in the load-sense fluid line 520 has a pressure level of 1000 psi, the variable displacement load-sensing pump 524 discharges fluid at a pressure level of 1300 psi, which is then provided to the directional control valves 502A, 502B.

The directional control valve 502A can include four ports: (i) an inlet port 528A that is fluidly-coupled to the variable displacement load-sensing pump 524, (ii) a return port 530A that is fluidly-coupled to the fluid reservoir 526, (iii) a first valve workport 532A that is fluidly-coupled to the first port 112A of the valve 100A, and (iv) a second valve workport 534A that is fluidly-coupled to the second chamber 510A via the counterbalance valve 514A.

In an example, the directional control valve 502A can be as spool type valve having a spool that is axially-movable within a bore in a valve body of the directional control valve 502A. In this example, the spool can be biased to a neutral position by two springs as represented schematically in FIG. 5. In the example implementation of FIG. 5, the directional control valve 502A is configured such that in such neutral position, the spool blocks fluid flow from the variable displacement load-sensing pump 524, while fluidly coupling both valve workports 532A, 534A to the return port 530A, and the fluid reservoir 526. However, in other example implementation, the directional control valve 502A can be configured such that all of its four ports are blocked in the neutral position.

In an example, the directional control valve 502A can be electrically-actuated. For instance, the directional control valve 502A can have a first solenoid 536A and a second solenoid 538A. When the first solenoid 536A is energized, e.g., via an electronic controller (not shown) of the hydraulic system 500, the directional control valve 502 operates in a first state in which the inlet port 528A is fluidly-coupled to the first valve workport 532A, and the second valve workport 534A is fluidly-coupled to the return port 530A. When the first solenoid 538A is energized, e.g., via an electronic controller (not shown) of the hydraulic system 500, the directional control valve 502A operates in a second state in which the inlet port 528A is fluidly-coupled to the second valve workport 534A, and the first valve workport 532A is fluidly-coupled to the return port 530A.

The directional control valve 502B is configured similar to the directional control valve 502A. As such, the directional control valve 502B can include four ports: (i) an inlet port 528B that is fluidly-coupled to the variable displacement load-sensing pump 524, (ii) a return port 530B that is fluidly-coupled to the fluid reservoir 526, (iii) a first valve workport 532B that is fluidly-coupled to the first port 112B of the valve 100B, (iv) a second valve workport 534B that is fluidly-coupled to the fourth chamber 510B via the counterbalance valve the counterbalance valve 514B, (v) two springs biasing its spool to a neutral position, (vi) a first solenoid 536B, and (vii) a second solenoid 538B.

The directional control valves 502A, 502B meter fluid flow (i.e., control fluid flow rate) to and from their respective hydraulic cylinder actuators. The valves 100A, 100B are configured as post pressure compensation valves that are disposed after, and operate to maintain a constant pressure drop across, the directional control valves 502A, 502B, respectively. By maintaining a constant pressure drop across a metering valve, the magnitude of a command signal to a solenoid of the directional control valve 502A, 502B is proportional to the fluid flow rate therethrough.

For example, using the Bernoulli orifice equation, the fluid flow rate Q through the directional control valve 502A can be determined as: $Q=K\sqrt{\Delta P}$, where $\Delta P$ is the pressure drop across the directional control valve 502A. For instance, if fluid flows from the variable displacement load-sensing pump 524 through the inlet port 528A to the first valve workport 532A, which is fluidly coupled to the first port 112A of the valve 100, then the fluid flow rate Q can be determined as: $Q=K\sqrt{(P_{Inlet}-P_1)}$, where $P_{Inlet}$ is pressure level at the inlet port 528A and $P_1$ is pressure level of fluid at the first valve workport 532A (substantially the same as pressure level of fluid at the first port 112A of the valve 100A. By maintaining the pressure drop $\Delta P$ across the directional control valve 502A substantially constant, the flow rate Q becomes proportional to the variable K, which is proportional to the magnitude of the command signal to the solenoid 536A, which in turn determines the axial position of the spool of the directional control valve 502A and the size of the flow area through the directional control valve 502A.

Operation of the hydraulic system 500 is described through an example for illustration. It is assumed that the controller of the hydraulic system 500 commands both the actuator piston 506A and the actuator piston 506B to extend. As such, the controller energizes the solenoid 536A and the solenoid 536B. This way, fluid flows from the variable displacement load-sensing pump 524 to the inlet ports 528A, 528B, then to the first valve workports 532A, 532B, then to the first ports 112A, 112B of the valves 100A, 100B.

It is also assumed that the load on the actuator piston 506A induces a pressure level of 500 psi in the first chamber 508A, whereas the load on the actuator piston 506B induces a pressure level of 1000 psi in the third chamber 508B. Thus, pressure level at the second port 113B is 1000 psi, which is communicated via the check valve 519B to the load-sense port 114B and the load-sense fluid line 520. The higher pressure level of 1000 psi is also communicated from the load-sense fluid line 520 to the load-sense port 114A.

The load-sense fluid signal is also communicated to the variable displacement load-sensing pump 524, which adds a margin pressure of 300 psi, and provides fluid at a pressure level of 1300 psi to the inlet ports 528A, 528B of the directional control valves 502A, 502B. Assuming that the pressure compensation springs 146A, 146B are 50 psi springs, then the pressure level at the first ports 112A, 112B that causes the valves 100A, 100B to open is 50 psi higher than the pressure level at the load-sense ports 114A, 114B. As such, the pressure level at the first ports 112A, 112B is 1050 psi, regardless of what the pressure level at the second ports 113A, 113B is. Therefore, the pressure drop $\Delta P$ across the directional control valve 502A is the same as the pressure drop $\Delta P$ across the directional control valve 502B and is equal to 250 psi.

Thus, regardless of variations of the load induced pressure levels in the chambers of the hydraulic cylinder actuators 504A, 504B, the highest pressure among the four chambers is communicated to the load-sense ports 114A, 114B, and therefore the pressure level at the first ports 112A, 112B is adjusted to be 50 psi above such highest load pressure level, and the variable displacement load-sensing pump 524 adjusts the pressure level of fluid discharged therefrom to be 300 psi above the highest load pressure level so as to maintain a constant pressure drop of 250 psi across the directional control valves 502A, 502B, respectively.

This post compensation configuration allows for flow sharing between the two hydraulic cylinder actuators 504A, 504B. For example, if the variable displacement load-sensing pump 524 has a capacity of 20 gallons per minute (GPM), and the directional control valves 502A, 502B are actuated such that the hydraulic cylinder actuator 504A demands 15 GPM and the hydraulic cylinder actuator 504B demands 10 GPM, then the demand exceeds the capacity of the variable displacement load-sensing pump 524 by 5 GPM. In this case, due to the post compensation configuration that takes into consideration the highest load pressure level, which is communicated to the load-sense ports 114A, 114B of both valves 100A, 100B, the fluid flow rates provided to the hydraulic cylinder actuators 504A, 504B are reduced proportionally, such that the hydraulic cylinder actuator 504A receives 12 GPM and the hydraulic cylinder actuator 504B receives 8 GPM, for example.

To retract the actuator piston 506A, the second solenoid 538A of the directional control valve 502A is energized, e.g., via an electronic controller (not shown) of the hydraulic system 500. When the second solenoid 538A is energized, the directional control valve 502A operates in the second state in which the directional control valve 502A directs fluid flow from the variable displacement load-sensing pump 524 through the inlet port 528A and the second valve workport 534A, through the fluid line 516A and the check valve 515A to the second chamber 510A, causing the actuator piston 506A to retract. Fluid discharged from the first chamber 508A of the hydraulic cylinder actuator 504A flows through the counterbalance valve 512A and the fluid line 518A to the second port 113A of the valve 100A.

The valve 100A then operates in the second mode of operation (reverse free flow mode) described above with respect to FIG. 4, to allow fluid flow from the second port 113A to the first port 112A, which is fluidly coupled to the fluid reservoir 526 via the first valve workport 532A and the return port 530A. Notably, a low pressure level (e.g., 15 psi) at the first chamber 508A is sufficient to open the valve 100A against the reverse flow spring 134A and allow fluid flow to the first port 112A.

Similarly, to retract the actuator piston 506B, the second solenoid 538B of the directional control valve 502B is energized. The directional control valve 502B directs fluid flow from the variable displacement load-sensing pump 524 through the inlet port 528B and the second valve workport 534B, through the fluid line 516B and the check valve 515B to the fourth chamber 510B, causing the actuator piston 506B to retract.

Fluid discharged from the third chamber 508B of the hydraulic cylinder actuator 504B flows through the counterbalance valve 512B and the fluid line 518B to the second port 113B of the valve 100B. The valve 100B then operates in the second mode of operation (reverse free flow mode) described above with respect to FIG. 4, to allow fluid flow from the second port 113B to the first port 112B, which is fluidly coupled to the fluid reservoir 526 via the first valve workport 532B and the return port 530B.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiments (EEEs) listed below.

EEE 1 is a valve comprising: a plurality of ports comprising: a first port, a second port, and a load-sense port; a valve piston configured to block fluid flow from the first port to the second port when the valve piston is in a neutral position; a reverse flow spring applying a first biasing force on the valve piston in a proximal direction; and a pressure compensation spring disposed in a spring chamber and applying a second biasing force on the valve piston in a distal direction, wherein when pressure level of fluid at the second port is higher than pressure level of fluid at the load-sense port, fluid flows from the second port to the spring chamber and the load-sense port, and wherein when pressure level of fluid at the load-sense port is higher than pressure level of fluid at the second port, fluid of the load-sense port is provided to the spring chamber, wherein fluid from the first port applies a first fluid force on the valve piston in the proximal direction, and fluid in the spring chamber applies a second fluid force on the valve piston in the distal direction, and wherein the valve operates in: (i) a first mode of operation, wherein the first fluid force of fluid from the first port overcomes the second biasing force of the pressure compensation spring and the second fluid force of fluid in the spring chamber, thereby moving the valve piston in the proximal direction and allowing fluid flow from the first port to the second port, and (ii) a second mode of operation, wherein fluid force of fluid from the second port overcomes the second biasing force of the reverse flow spring, causing the valve piston to move in the distal direction and allow fluid flow from the second port to the first port.

EEE 2 is the valve of claim 1, further comprising: a check element configured to allow fluid flow from the second port to the spring chamber and the load-sense port when pressure level at the second port is higher than pressure level at the load-sense port, and wherein the check element blocks fluid flow from the load-sense port to the second port.

EEE 3 is the valve of any of EEEs 1-2, wherein the second port comprises: a main flow cross-hole, and an input load signal cross-hole, and wherein the load-sense port comprises an output load-sense cross-hole, wherein (i) when the valve operates in the first mode of operation and pressure level at the second port is higher than pressure level at the load-sense port, fluid flows from the second port through the input load signal cross-hole, then through valve piston to the spring chamber, and wherein upon the valve piston moving in the proximal direction, fluid flow from the first port through the main flow cross-hole to the second port, and (ii) when the valve operates in the second mode of operation and pressure level at the second port is higher than pressure level at the load-sense port, fluid from the second port flows through the input load signal cross-hole, then through the valve piston to the spring chamber, and then through the output load-sense cross-hole of the load-sense port, and wherein upon the valve piston moving in the distal direction, fluid flows from the second port through the main flow cross-hole to the first port.

EEE 4 is the valve of EEE 3, further comprising: a housing comprising a longitudinal cylindrical cavity therein; and a sleeve disposed partially within longitudinal cylindrical cavity of the housing, wherein the sleeve comprises a respective longitudinal cylindrical cavity therein, wherein the valve piston is axially-movable within the respective longitudinal cylindrical cavity of the sleeve, wherein the first port is disposed at a distal end of the sleeve, wherein the main flow cross-hole and the input load signal cross-hole of the second port are formed in the sleeve, such that the input load signal cross-hole is axially-spaced from the main flow cross-hole along a length of the sleeve, and wherein the output load-sense cross-hole of the second port is formed in the housing.

EEE 5 is the valve of EEE 4, wherein the valve piston comprises a piston cross-hole, wherein when the valve operates in the second mode of operation, fluid flows from the second port through the main flow cross-hole, through the piston cross-hole, which overlaps the main flow cross-hole when the valve piston moves in the distal direction, then to the first port.

EEE 6 is the valve of any of EEEs 1-5, further comprising: a bushing configured to move with the valve piston as the valve piston moves in the proximal direction when the valve operates in the first mode of operation, and wherein the valve piston separates from the bushing as the valve piston moves in the distal direction when the valve operates in the second mode of operation.

EEE 7 is the valve of EEE 6, wherein the bushing comprises a slot through which fluid received at the second port is communicated to the spring chamber.

EEE 8 is the valve of any of EEEs 6-7, wherein the bushing comprises: a cylindrical portion; and a flange against which the reverse flow spring rests.

EEE 9 is the valve of EEE 8, further comprising: a spring retaining ring disposed about the valve piston, wherein the reverse flow spring is disposed between the flange and the spring retaining ring.

EEE 10 is the valve of any of EEEs 6-9, further comprising: a compensation spring cap disposed between the bushing and the pressure compensation spring, wherein the pressure compensation spring applies the second biasing force to the valve piston via the compensation spring cap and the bushing.

EEE 11 is a hydraulic system comprising: a variable displacement load-sensing pump; a fluid reservoir; a hydraulic cylinder actuator having a first chamber and a second chamber; a valve comprising: (i) a first port, (ii) a second port that is fluidly-coupled to the first chamber of the hydraulic cylinder actuator, (iii) a load-sense port that is fluidly-coupled to the variable displacement load-sensing pump, (iv) a valve piston, (v) a reverse flow spring applying a first biasing force on the valve piston in a proximal direction, and (vi) a pressure compensation spring disposed in a spring chamber and applying a second biasing force on the valve piston in a distal direction, wherein when pressure level of fluid at the second port is higher than pressure level of fluid at the load-sense port, fluid flows from the second port to the spring chamber and the load-sense port, and wherein when pressure level of fluid at the load-sense port is higher than pressure level of fluid at the second port, fluid of the load-sense port is provided to the spring chamber, wherein fluid from the first port applies a first fluid force on the valve piston in the proximal direction, and fluid in the spring chamber applies a second fluid force on the valve piston in the distal direction; and a directional control valve interposed between the variable displacement load-sensing pump and the valve, wherein the variable displacement load-sensing pump is configured to provide fluid having a pressure level equal to pressure level of fluid of the load-sense port plus a margin pressure to the directional control valve, wherein: in a first mode of operation, fluid from the variable displacement load-sensing pump flows through directional control valve, wherein fluid is subjected to a pressure drop across the directional control valve, then to the first port of the valve, wherein the first fluid force of fluid from the first port overcomes the second biasing force of the pressure compensation spring and the second fluid force of fluid in the spring chamber, thereby moving the valve piston in the proximal direction and allowing fluid flow from the first port to the second port, wherein pressure level at the first port varies as pressure level at the load-sense port varies, such that the pressure drop across the directional control valve is maintained substantially constant regardless of pressure level at the second port or the load-sense port, wherein the directional control valve directs fluid flow from the second chamber to the fluid reservoir, and in a second mode of operation, fluid force of fluid received from the first chamber at the second port overcomes the second biasing force of the reverse flow spring, causing the valve piston to move in the distal direction and allow fluid flow from the second port to the first port, then through the directional control valve to the fluid reservoir.

EEE 12 is the hydraulic system of EEE 11, wherein the hydraulic cylinder actuator is a first hydraulic cylinder actuator, wherein the directional control valve is a first directional control valve, and the valve is a first valve, and wherein the hydraulic system further comprises: a second hydraulic cylinder actuator having a third chamber and a fourth chamber; a second valve comprising: (i) a respective first port, (ii) a respective second port that is fluidly-coupled to the third chamber of the second hydraulic cylinder actuator, (iii) a respective load-sense port that is fluidly-coupled to the load-sense port of the first valve, such that the variable displacement load-sensing pump receives a load-sense fluid signal having higher pressure level among the load-sense port of the first valve and the respective load-sense port of the second valve; and a second directional control valve interposed between the variable displacement load-sensing pump and the second valve, wherein the variable displacement load-sensing pump is configured to provide fluid having a pressure level equal to pressure level of load-sense fluid signal plus a margin pressure to the first directional control valve and the second directional control valve.

EEE 13 is the hydraulic system of any of EEEs 11-12, wherein the valve further comprises: a bushing configured to move with the valve piston as the valve piston moves in the proximal direction in the first mode of operation, and wherein the valve piston separates from the bushing as the valve piston moves in the distal direction in the second mode of operation.

EEE 14 is the hydraulic system of EEE 13, wherein the bushing comprises: a slot through which fluid received at the first port is communicated to the spring chamber; a cylindrical portion; and a flange against which the reverse flow spring rests.

EEE 15 is the hydraulic system of EEE 14, wherein the valve further comprises: a spring retaining ring disposed about the valve piston, wherein the reverse flow spring is disposed between the flange and the spring retaining ring.

EEE 16 is the hydraulic system of any of EEEs 13-15, wherein the valve further comprises: a compensation spring cap disposed between the bushing and the pressure compensation spring, wherein the pressure compensation spring applies the second biasing force to the valve piston via the compensation spring cap and the bushing.

EEE 17 is the hydraulic system of any of EEEs 11-16, wherein the valve further comprises: a check element configured to allow fluid flow from the second port to the spring chamber and the load-sense port when pressure level at the second port is higher than pressure level at the load-sense port, and wherein the check element blocks fluid flow from the load-sense port to the second port.

EEE 18 is the hydraulic system of any of EEEs 11-17, wherein the second port comprises: a main flow cross-hole, and an input load signal cross-hole, and wherein the load-sense port comprises an output load-sense cross-hole, wherein (i) in the first mode of operation, when pressure level at the second port is higher than pressure level at the load-sense port, fluid flows from the second port through the input load signal cross-hole, then through valve piston to the spring chamber, and wherein upon the valve piston moving in the proximal direction, fluid flow from the first port through the main flow cross-hole to the second port, and (ii) in the second mode of operation, when pressure level at the second port is higher than pressure level at the load-sense port, fluid from the second port flows through the input load signal cross-hole, then through the valve piston to the spring chamber, and then through the output load-sense cross-hole of the load-sense port, and wherein upon the valve piston moving in the distal direction, fluid flows from the second port through the main flow cross-hole to the first port.

EEE 19 is the hydraulic system of EEE 18, wherein the valve further comprises: a housing comprising a longitudinal cylindrical cavity therein; and a sleeve disposed partially within longitudinal cylindrical cavity of the housing, wherein the sleeve comprises a respective longitudinal cylindrical cavity therein, wherein the valve piston is axially-movable within the respective longitudinal cylindrical cavity of the sleeve, wherein the first port is disposed at a distal end of the sleeve, wherein the main flow cross-hole and the input load signal cross-hole of the second port are formed in the sleeve, such that the input load signal cross-hole is axially-spaced from the main flow cross-hole along a length of the sleeve, and wherein the output load-sense cross-hole of the second port is formed in the housing.

EEE 20 is the hydraulic system of EEE 19, wherein the valve piston comprises a piston cross-hole, wherein in the second mode of operation, fluid flows from the second port through the main flow cross-hole, through the piston cross-hole, which overlaps the main flow cross-hole when the valve piston moves in the distal direction, then to the first port.

What is claimed is:
1. A valve comprising:
a plurality of ports comprising: a first port, a second port, and a load-sense port;
a valve piston configured to block fluid flow from the first port to the second port when the valve piston is in a neutral position;
a reverse flow spring applying a first biasing force on the valve piston in a proximal direction; and
a pressure compensation spring disposed in a spring chamber and applying a second biasing force on the valve piston in a distal direction, wherein when the pressure level of fluid at the second port is higher than the pressure level of fluid at the load-sense port, fluid flows from the second port to the spring chamber and the load-sense port, and wherein when the pressure level of fluid at the load-sense port is higher than the pressure level of fluid at the second port, fluid of the load-sense port is provided to the spring chamber, wherein fluid from the first port applies a first fluid force on the valve piston in the proximal direction, and fluid in the spring chamber applies a second fluid force on the valve piston in the distal direction, and wherein the valve operates in: (i) a first mode of operation, wherein the first fluid force of fluid from the first port overcomes the second biasing force of the pressure compensation spring and the second fluid force of fluid in the spring chamber, thereby moving the valve piston in the proximal direction and allowing fluid flow from the first port to the second port, and (ii) a second mode of operation, wherein fluid force of fluid from the second port overcomes the second biasing force of the reverse flow spring, causing the valve piston to move in the distal direction and allow fluid flow from the second port to the first port.

2. The valve of claim 1, further comprising a check element configured to allow fluid flow from the second port to the spring chamber and the load-sense port when the pressure level at the second port is higher than the pressure level at the load-sense port, and wherein the check element blocks fluid flow from the load-sense port to the second port.

3. The valve of claim 1, wherein the second port comprises: a main flow cross-hole, and an input load signal cross-hole, and wherein the load-sense port comprises an output load-sense cross-hole, wherein (i) when the valve operates in the first mode of operation and the pressure level at the second port is higher than the pressure level at the load-sense port, fluid flows from the second port through the input load signal cross-hole, then through valve piston to the spring chamber, and wherein upon the valve piston moving in the proximal direction, fluid flow from the first port through the main flow cross-hole to the second port, and (ii) when the valve operates in the second mode of operation and the pressure level at the second port is higher than the pressure level at the load-sense port, fluid from the second port flows through the input load signal cross-hole, then through the valve piston to the spring chamber, and then through the output load-sense cross-hole of the load-sense port, and wherein upon the valve piston moving in the distal direction, fluid flows from the second port through the main flow cross-hole to the first port.

4. The valve of claim 3, further comprising:
a housing comprising a longitudinal cylindrical cavity therein; and
a sleeve disposed partially within longitudinal cylindrical cavity of the housing, wherein the sleeve comprises a respective longitudinal cylindrical cavity therein, wherein the valve piston is axially-movable within the respective longitudinal cylindrical cavity of the sleeve, wherein the first port is disposed at a distal end of the sleeve, wherein the main flow cross-hole and the input load signal cross-hole of the second port are formed in the sleeve, such that the input load signal cross-hole is axially-spaced from the main flow cross-hole along a length of the sleeve, and wherein the output load-sense cross-hole of the second port is formed in the housing.

5. The valve of claim 4, wherein the valve piston comprises a piston cross-hole, wherein when the valve operates in the second mode of operation, fluid flows from the second port through the main flow cross-hole, through the piston cross-hole, which overlaps the main flow cross-hole when the valve piston moves in the distal direction, then to the first port.

6. The valve of claim 1, further comprising:
a bushing configured to move with the valve piston as the valve piston moves in the proximal direction when the valve operates in the first mode of operation, and wherein the valve piston separates from the bushing as the valve piston moves in the distal direction when the valve operates in the second mode of operation.

7. The valve of claim 6, wherein the bushing comprises a slot through which fluid received at the second port is communicated to the spring chamber.

8. The valve of claim 6, wherein the bushing comprises:
a cylindrical portion; and
a flange against which the reverse flow spring rests.

9. The valve of claim 8, further comprising:
a spring retaining ring disposed about the valve piston, wherein the reverse flow spring is disposed between the flange and the spring retaining ring.

10. The valve of claim 6, further comprising:
a compensation spring cap disposed between the bushing and the pressure compensation spring, wherein the pressure compensation spring applies the second biasing force to the valve piston via the compensation spring cap and the bushing.

11. A hydraulic system comprising:
a variable displacement load-sensing pump;
a fluid reservoir;
a hydraulic cylinder actuator having a first chamber and a second chamber;
a valve comprising: (i) a first port, (ii) a second port that is fluidly-coupled to the first chamber of the hydraulic cylinder actuator, (iii) a load-sense port that is fluidly-coupled to the variable displacement load-sensing pump, (iv) a valve piston, (v) a reverse flow spring applying a first biasing force on the valve piston in a proximal direction, and (vi) a pressure compensation spring disposed in a spring chamber and applying a second biasing force on the valve piston in a distal direction, wherein when the pressure level of fluid at the second port is higher than the pressure level of fluid at the load-sense port, fluid flows from the second port to the spring chamber and the load-sense port, and wherein when the pressure level of fluid at the load-sense port is higher than the pressure level of fluid at the second port, fluid of the load-sense port is provided to the spring chamber, wherein fluid from the first port applies a first fluid force on the valve piston in the proximal direction, and fluid in the spring chamber applies a second fluid force on the valve piston in the distal direction; and
a directional control valve interposed between the variable displacement load-sensing pump and the valve, wherein the variable displacement load-sensing pump is configured to provide fluid having a pressure level equal to the pressure level of fluid of the load-sense port plus a margin pressure to the directional control valve, wherein:
in a first mode of operation, fluid from the variable displacement load-sensing pump flows through the directional control valve, wherein fluid is subjected to a pressure drop across the directional control valve, then to the first port of the valve, wherein the first fluid force of fluid from the first port overcomes the second biasing force of the pressure compensation spring and the second fluid force of fluid in the spring chamber, thereby moving the valve piston in the proximal direction and allowing fluid flow from the first port to the second port, wherein the pressure level at the first port varies as the pressure level at the load-sense port varies, such that the pressure drop across the directional control valve is maintained substantially constant regardless of the pressure level at the second port or the load-sense port, wherein the directional control valve directs fluid flow from the second chamber to the fluid reservoir, and
in a second mode of operation, fluid force of fluid received from the first chamber at the second port overcomes the second biasing force of the reverse flow spring, causing the valve piston to move in the distal direction and allow fluid flow from the second port to the first port, then through the directional control valve to the fluid reservoir.

12. The hydraulic system of claim 11, wherein the hydraulic cylinder actuator is a first hydraulic cylinder actuator, wherein the directional control valve is a first directional control valve, and the valve is a first valve, and wherein the hydraulic system further comprises:
a second hydraulic cylinder actuator having a third chamber and a fourth chamber;
a second valve comprising: (i) a respective first port, (ii) a respective second port that is fluidly-coupled to the third chamber of the second hydraulic cylinder actuator, (iii) a respective load-sense port that is fluidly-coupled to the load-sense port of the first valve, such that the variable displacement load-sensing pump receives a load-sense fluid signal having the higher pressure level among the load-sense port of the first valve and the respective load-sense port of the second valve;
and a second directional control valve interposed between the variable displacement load-sensing pump and the second valve, wherein the variable displacement load-sensing pump is configured to provide fluid having a pressure level equal to the pressure level of load-sense fluid signal plus a margin pressure to the first directional control valve and the second directional control valve.

13. The hydraulic system of claim 11, wherein the valve further comprises:
a bushing configured to move with the valve piston as the valve piston moves in the proximal direction in the first mode of operation, and wherein the valve piston separates from the bushing as the valve piston moves in the distal direction in the second mode of operation.

14. The hydraulic system of claim 13, wherein the bushing comprises:
a slot through which fluid received at the first port is communicated to the spring chamber;
a cylindrical portion; and
a flange against which the reverse flow spring rests.

15. The hydraulic system of claim 14, wherein the valve further comprises:
a spring retaining ring disposed about the valve piston, wherein the reverse flow spring is disposed between the flange and the spring retaining ring.

16. The hydraulic system of claim 13, wherein the valve further comprises:
a compensation spring cap disposed between the bushing and the pressure compensation spring, wherein the pressure compensation spring applies the second biasing force to the valve piston via the compensation spring cap and the bushing.

17. The hydraulic system of claim 11, wherein the valve further comprises:
a check element configured to allow fluid flow from the second port to the spring chamber and the load-sense port when the pressure level at the second port is higher than the pressure level at the load-sense port, and wherein the check element blocks fluid flow from the load-sense port to the second port.

18. The hydraulic system of claim 11, wherein the second port comprises: a main flow cross-hole, and an input load signal cross-hole, and wherein the load-sense port comprises an output load-sense cross-hole, wherein (i) in the first mode of operation, when the pressure level at the second port is higher than the pressure level at the load-sense port, fluid flows from the second port through the input load signal cross-hole, then through valve piston to the spring chamber, and wherein upon the valve piston moving in the proximal direction, fluid flow from the first port through the main flow cross-hole to the second port, and (ii) in the second mode of operation, when the pressure level at the second port is higher than the pressure level at the load-sense port, fluid from the second port flows through the input load signal cross-hole, then through the valve piston to the spring chamber, and then through the output load-sense cross-hole of the load-sense port, and wherein upon the valve piston moving in the distal direction, fluid flows from the second port through the main flow cross-hole to the first port.

19. The hydraulic system of claim 18, wherein the valve further comprises:
a housing comprising a longitudinal cylindrical cavity therein; and
a sleeve disposed partially within longitudinal cylindrical cavity of the housing, wherein the sleeve comprises a respective longitudinal cylindrical cavity therein, wherein the valve piston is axially-movable within the respective longitudinal cylindrical cavity of the sleeve, wherein the first port is disposed at a distal end of the sleeve, wherein the main flow cross-hole and the input load signal cross-hole of the second port are formed in the sleeve, such that the input load signal cross-hole is axially-spaced from the main flow cross-hole along a length of the sleeve, and wherein the output load-sense cross-hole of the second port is formed in the housing.

20. The hydraulic system of claim 19, wherein the valve piston comprises a piston cross-hole, wherein in the second mode of operation, fluid flows from the second port through the main flow cross-hole, through the piston cross-hole, which overlaps the main flow cross-hole when the valve piston moves in the distal direction, then to the first port.

* * * * *